United States Patent
Allen (10) Patent No.: US 7,308,233 B2
(45) Date of Patent: Dec. 11, 2007

(54) SYSTEM EMPLOYING WIDEBAND WIRELESS COMMUNICATION WITH SUPER CYCLE DETECTION

(75) Inventor: James D Allen, Rochester, NY (US)

(73) Assignee: Aster Wireless, W. Henrietta, NY (US)

( * ) Notice: Subject to any disclaimer, the term of this patent is extended or adjusted under 35 U.S.C. 154(b) by 0 days.

(21) Appl. No.: 10/267,589

(22) Filed: Oct. 10, 2002

(65) Prior Publication Data

US 2004/0203399 A1    Oct. 14, 2004

(51) Int. Cl.
H04B 17/00    (2006.01)
(52) U.S. Cl. ............................. 455/67.13; 455/67.11; 455/63.1
(58) Field of Classification Search ...... 455/41.1–41.3, 455/67.11–67.7, 63.1
See application file for complete search history.

(56) References Cited

U.S. PATENT DOCUMENTS

| | | | |
|---|---|---|---|
| 4,398,290 A | 8/1983 | Mathieu et al. |
| 4,451,792 A | 5/1984 | Gay |
| 4,763,074 A | 8/1988 | Fox |
| 4,799,052 A | 1/1989 | Near et al. |
| 5,128,755 A | 7/1992 | Fancher |
| 5,432,787 A | 7/1995 | Chethik |
| 5,463,657 A | 10/1995 | Rice |
| 5,481,257 A | 1/1996 | Brubaker et al. |
| 5,491,507 A | 2/1996 | Umezawa et al. |
| 5,504,774 A | 4/1996 | Takai et al. |
| 5,524,116 A | 6/1996 | Kalmanek, Jr. et al. |
| 5,541,852 A | 7/1996 | Eyuboglu et al. |
| 5,548,825 A | 8/1996 | Maemura et al. |
| 5,566,206 A | 10/1996 | Butler et al. |
| 5,574,979 A | 11/1996 | West |
| 5,576,702 A | 11/1996 | Samoylenko |
| 5,594,944 A | 1/1997 | Ogata et al. |
| 5,602,831 A | 2/1997 | Gaskill |
| 5,648,965 A | 7/1997 | Thadani et al. |
| 5,697,068 A | 12/1997 | Salvi et al. |
| 5,724,155 A | 3/1998 | Saito |
| 5,745,479 A | 4/1998 | Burns et al. |
| 5,745,484 A | 4/1998 | Scott |
| 5,754,553 A | 5/1998 | Shimoda |
| 5,764,651 A | 6/1998 | Bullock et al. |
| 5,768,687 A | 6/1998 | Marzoug |
| 5,774,658 A | 6/1998 | Kalkunte et al. |

(Continued)

FOREIGN PATENT DOCUMENTS

WO    WO 95/30290    11/1995

OTHER PUBLICATIONS

U.S. Appl. No. 09/162,197, filed Sep. 28, 1998, Carlson, Appairent Technologies, Inc.

(Continued)

*Primary Examiner*—Lewis West
(74) *Attorney, Agent, or Firm*—Staas & Halsey LLP (57) ABSTRACT

A system including a digital appliance having a high data rate wideband RF transceiver operating in a microwave band for communicating digital data within quiescent periods of periodic noise and within quiescent periods within super cycle noise enclosing the periodic noise. The quiescent periods can also be used to control power management of the appliance as well as perform network control.

20 Claims, 7 Drawing Sheets

U.S. PATENT DOCUMENTS

| | | | |
|---|---|---|---|
| 5,802,060 | A | 9/1998 | Fischbach et al. |
| 5,806,005 | A | 9/1998 | Hull et al. |
| 5,828,293 | A | 10/1998 | Rickard |
| 5,829,044 | A | 10/1998 | Sono |
| 5,859,853 | A | 1/1999 | Carlson |
| 5,862,452 | A | 1/1999 | Cudak et al. |
| 5,864,557 | A | 1/1999 | Lyons |
| 5,903,819 | A | 5/1999 | Romesburg |
| 5,917,542 | A | 6/1999 | Moghadam et al. |
| 5,974,081 | A | 10/1999 | Rosas et al. |
| 6,006,071 | A | 12/1999 | Roberts et al. |
| 6,009,332 | A | 12/1999 | Haartsen |
| 6,009,336 | A | 12/1999 | Harris et al. |
| 6,014,689 | A | 1/2000 | Budge et al. |
| 6,058,106 | A | 5/2000 | Cudak et al. |
| 6,072,784 | A | 6/2000 | Agrawal et al. |
| 6,091,956 | A | 7/2000 | Hollenberg |
| 6,167,469 | A | 12/2000 | Safai et al. |
| 6,175,860 | B1 | 1/2001 | Gaucher |
| 6,256,478 | B1 * | 7/2001 | Allen et al. ............... 455/63.1 |
| 6,278,884 | B1 | 8/2001 | Kim |
| 6,316,758 | B1 * | 11/2001 | Ubowski et al. ............ 219/702 |
| 6,349,198 | B1 | 2/2002 | Carlson et al. |
| 6,374,082 | B1 | 4/2002 | Carlson |
| 6,389,339 | B1 | 5/2002 | Just |
| 6,396,537 | B1 | 5/2002 | Squilla et al. |
| 6,711,380 | B1 * | 3/2004 | Callaway, Jr. ............. 455/41.2 |
| 2001/0056501 | A1 * | 12/2001 | Law et al. .................. 709/248 |
| 2002/0039888 | A1 * | 4/2002 | Hama ......................... 455/63 |
| 2003/0120809 | A1 * | 6/2003 | Bellur et al. ............... 709/239 |

OTHER PUBLICATIONS

U.S. Appl. No. 09/498,576, filed Feb. 4, 2000, Carlson et al., Appairent Technologies, Inc.

U.S. Appl. No. 09/506,047, filed Feb. 17, 2000, Carlson, Appairent Technologies, Inc.

U.S. Appl. No. 09/514,996, filed Feb. 29, 2000, Carlson, Appairent Technologies, Inc.

U.S. Appl. No. 09/618,329, filed Jul. 18, 2000, McDermontt, Appairent Technologies, Inc.

U.S. Appl. No. 09/690,315, filed Oct. 17, 2000, Schrader, Appairent Technologies, Inc.

U.S. Appl. No. 09/575,597, filed May 22, 2000, Carlson, Appairent Technologies, Inc.

U.S. Appl. No. 09/605,025, filed Jun. 28, 2000, Carlson, Appairent Technologies, Inc.

U.S. Appl. No. 09/519,199, filed Mar. 6, 2000, Carlson, Appairent Technologies, Inc.

U.S. Appl. No. 09/089,204, filed Jun. 2, 1998, Carlson, Appairent Technologies, Inc.

T. Shinozuka et al., Characteristics of Electromagnetic Disturbance from Microwave Ovens and the Interference with Digital Radio Communication Systems, 1995 International Symposium on Communications, vol. 2, pp. 769-776.

T. Kobayashi, Experimental Evaluation of Interference from Domestic Microwave Ovens to 1.9-GHz Digital Radio Transmission, IEEE 1995 International Symposium on Electromagnetic Compatibility, pp. 293-296.

J. Horne et al., Modeling and Mitigation of Interference in the 2.4 GHz ISM Band, Journal of Applied Microwave & Wireless, vol. 9, No. 2, 1997, pp. 59-60, 62, 64, 66-68, 70-71.

* cited by examiner

SYSTEM EMPLOYING WIDEBAND WIRELESS COMMUNICATION WITH SUPER CYCLE DETECTION

BACKGROUND OF THE INVENTION

1. Field of the Invention

This invention relates to a digital wireless communication system operating in a microwave band, such as the 2.4 to 2.5 GHz ISM (Industrial Scientific and Medical) Band. Such a system is useful, for example, for communicating many types of data, such as music data, video camera data, digital image data, web page data, etc., at high data rates; e.g. rates equal and greater than 10 Mega bits per second (Mbps).

2. Description of the Related Art

With the advent of digital data transmission applications such as short messaging service, email, digital music, video camera, digital photography, etc., the wireless transmission of digital data, for example between a transmitting device like a digital camera, computer or a music source and a receiving device such as a personal computer or other appliance, such as a printer, personal digital assistant (PDA) or music player, has become a desirable feature. High data rate transmissions are very desirable because digital images, music, web pages, etc. include a large amount of data and short transmission times are needed. Short transmission times result in shorter wait times while an image, a song, page, etc. is being transferred from a source to a receiver and in reduced battery power consumption. An additional desirable feature is being able to communicate at distances greater than 300 feet, and with new power licenses, and also to communicate through walls. These features would enable digital appliances, such as cameras, PDAs, or music players, to also communicate with associated equipment when the equipment is located inside a retail store, a home, etc. and the appliance is being operated, for example, from inside a nearby automobile. One additional useful feature is that the wireless communication be unlicensed and worldwide such that the digital appliance could be taken on vacation and used in any country in the world without airtime costs.

One way to send digital data without wires to a digital appliance is through the use of infrared technology. Similar in the way a remote control for a television or VCR works; digital images can be sent in a direct line of sight over short distances. Most current infrared technology that use the IrDA 1.1 standard are limited to data rates of about 4 Mbps. This technology is inexpensive, but does not work through walls and has maximum operation range less than 30 feet. Another way to send data without wires is through the use of radio waves. A use of radio waves to perform image communication is described in U.S. Pat. No. 5,806,005, issued Sep. 8, 1998 to Hull et al, entitled, "Wireless Image Transfer From A Digital Still Video Camera to a Network Computer". This patent demonstrates a potential solution of moving digital images using a cellular telephone transmitter. Unfortunately this technique has very slow data rates due to the use of the cellular telephone. The cellular phone is physically too large to be incorporated into the body of the digital appliance and results in an expensive system to both purchase and operate. The user of the system would not only need to purchase both the digital appliance, connecting wire and cellular phone but also pay by the minute for the air time (talk time) for using the cell phone. Worldwide use would be restricted and battery consumption would be high.

Therefore an improvement is needed for enabling digital cameras to communicate without wires. The most important factor in determining the usefulness of the wireless system would be selecting the frequency band of operation. There are several radio frequency bands that could be used for such type of transmissions. One of the most attractive communication bands for such a digital communication system is the 2.4 to 2.5 GHz ISM Band since the band is unlicensed and the only wide band available internationally to date. However, a major problem exists with the use of this band for wireless communication. The band is allocated to devices that produce periodic noise, such as microwave ovens and magnetron driven lightning systems, which generate a great deal of noise in the band.

Radio frequency (RF) transmissions in the 2.4 to 2.5 GHz ISM Band have historically had to deal with the presence of man-made noise from microwave ovens and presently proposed magnetron driven lighting systems that predominately operate in the center of this band at 2.45 GHz. The noise emanates from the oven or lighting structure by leakage through the devices enclosure. The leakage noise has a radiated output power approximately 20 to 30 dB greater in strength than that allowed by the FCC for operation of Part 15 non spread spectrum radios (i.e. approx. 1 milliwatt). With over 200 million microwave ovens in use throughout the world, they are currently the greatest and most significant source of noise in this band. Some examples of locations where it would be desirable to transmit data in the presence of microwave oven noise are in the home (particularly in the kitchen), or in a supermarket or retail store where a photo kiosk or digital minilab may be located near a microwave oven.

Another problem involved with microwave devices is the irregular and somewhat random periods in which they are operated, and their duty cycle mode of operation. When operating at full power a typical microwave oven has a periodic operating pattern of on/off cycles or duty cycles associated with the 60 Hz power source used for these devices. In addition, when an oven is operating at less than full power the oven operates with a super duty cycle. For example, in the defrost mode an oven might be on for 2 seconds and off for 8 seconds for a duty cycle of 20%. This super duty cycle constitutes another source of noise and surrounds the 50% duty cycle of the AC power division periodic noise.

Other sources of noise in the microwave band that have cycles and super cycles include rotating antenna microwave radars, such as those used for weather, and other microwave devices such as proposed lighting systems. With the advent of microwave lighting systems in venues where photography takes place (such as stadiums and museums), the problem becomes even more relevant.

SUMMARY OF THE INVENTION

The problem is solved according to the present invention by providing an appliance, such as a digital camera, PDA or music player, having incorporated within it a wideband RF transceiver operating in the 2.4 to 2.5 GHz ISM microwave band for communicating digital images at a high rate of speed (e.g. greater than 10 Mbps), and a data utilization/source device also having a wideband RF transceiver operating in the same ISM microwave band for communicating with the appliance. In a preferred embodiment, the wideband RF system sends and receives data during the quiescent period of an interfering periodic noise source including a super cycle. This detection of quiescent periods can also be used for other functions, such as power management, packet length optimization and network control.

ADVANTAGES OF THE INVENTION

The advantages of the present invention are that the wideband RF link provides high speed transmission of data by operating efficiently in the ISM microwave band and does not require an FCC or other country license. A further advantage is that the system provides for communication over useful distances (greater than 300 feet) convenient for downloading digital data while in the vicinity of the associated device, and does not require a direct line of sight connection. The wideband operation further presents very short wait times (less than 1 minute) to the operator during a typical download that could include more than 30 large photographic images in need of photo finishing. The short wait times further yield a significant savings in battery life for a portable transmitting device like a digital camera. The system is integrated into the appliance and has no airtime costs.

DETAILED DESCRIPTION OF THE INVENTION

Figure 5:
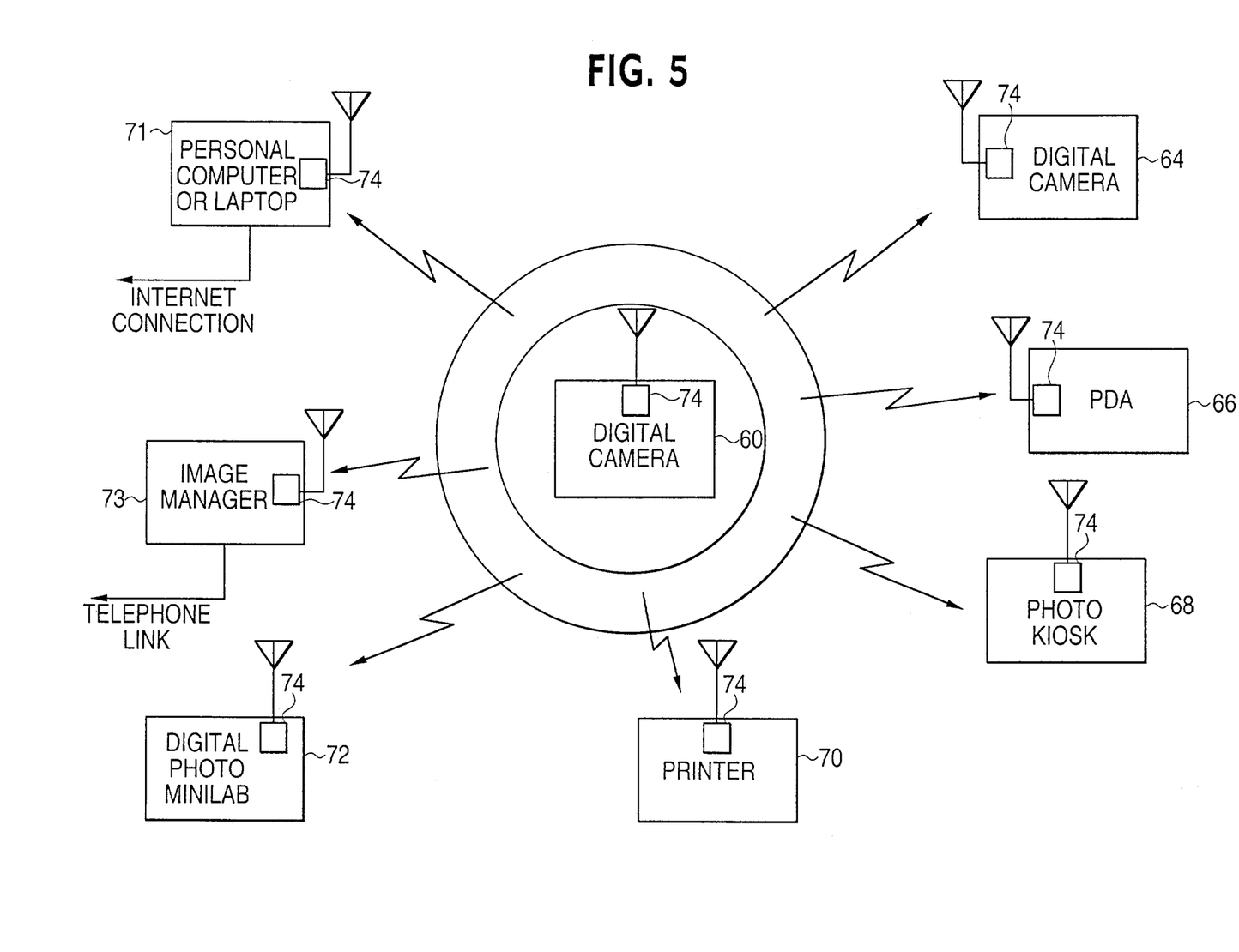
FIG. 5 is system block diagram showing communication between an appliance, such as a camera, and associated devices, such as an image utilization device according to the present invention.

The present invention can be used with a number of different types of appliances including cameras PDAs, music players, televisions, set top boxes, home automation systems, security systems as well as general purpose devices, such as portable computers and the wireless networks used to connect them. For the purpose of illustration, an embodiment where the appliance is a digital camera in a photography system will be discussed. Referring first to FIG. 5, several possible scenarios for a photography system according to the present invention are shown. The photography system includes at least a digital camera 60 as a data source and one or more image utilization devices having the capability of direct high speed RF communication of images. The image utilization devices or data destinations may include for example, a personal or laptop computer 62, another digital camera 64, a personal digital assistant 66, a photo kiosk 68 that can produce photographic quality prints, enlargements, and items such as greeting cards, and Picture CD™, a hardcopy output device such as a thermal or ink jet printer 70, a photo digital minilab 72 for producing many photographic quality prints at a high rate, or an image manager 73 that includes a computer work station, digital image storage, a communication link to a fulfillment center capable of producing prints, and other items such as mugs and T-shirts bearing the digital images, and a billing subsystem for billing customers for the services. The image manager 73 can be placed, for example, in a convenient location, for example, in a super market or a drugstore and photographic items are ordered from the fulfillment center and returned to customer at the super market or drugstore via common carrier.

For other types of appliances, such as a music player, the camera would be the player and the personal computer 74 would be the music data source and data would be transmitted form the computer to the player. For PDAs, a computer and the PDA would be both the data sources and the data destinations.

Each of the components (cameras and image utilization devices) of the photography system includes a wideband RF transceiver 74 operating in a microwave band capable of communicating at a high data rate (e.g. greater than 10 mbs) with each other. The microwave bands can include for example the 2.4 to 2.5 GHz ISM band, the 5.75 GHz ISM band, and the 5.1 to 5.3 GHz HyperLAN band.

In a typical operation, the digital camera 60 initiates the sending of its images by first scanning the microwave band, selecting an open channel and paging any and all receiving devices that may be listening on that band. A receiving device establishes communication with the camera by answering its page and by responding with an ID number and type designation. The communication between the two devices is half duplex packet data containing a protocol that enables the images and other data sent to be sent in either direction. Information, in addition to images, exchanged can include ID codes, the number and size of images.

Figure 6:
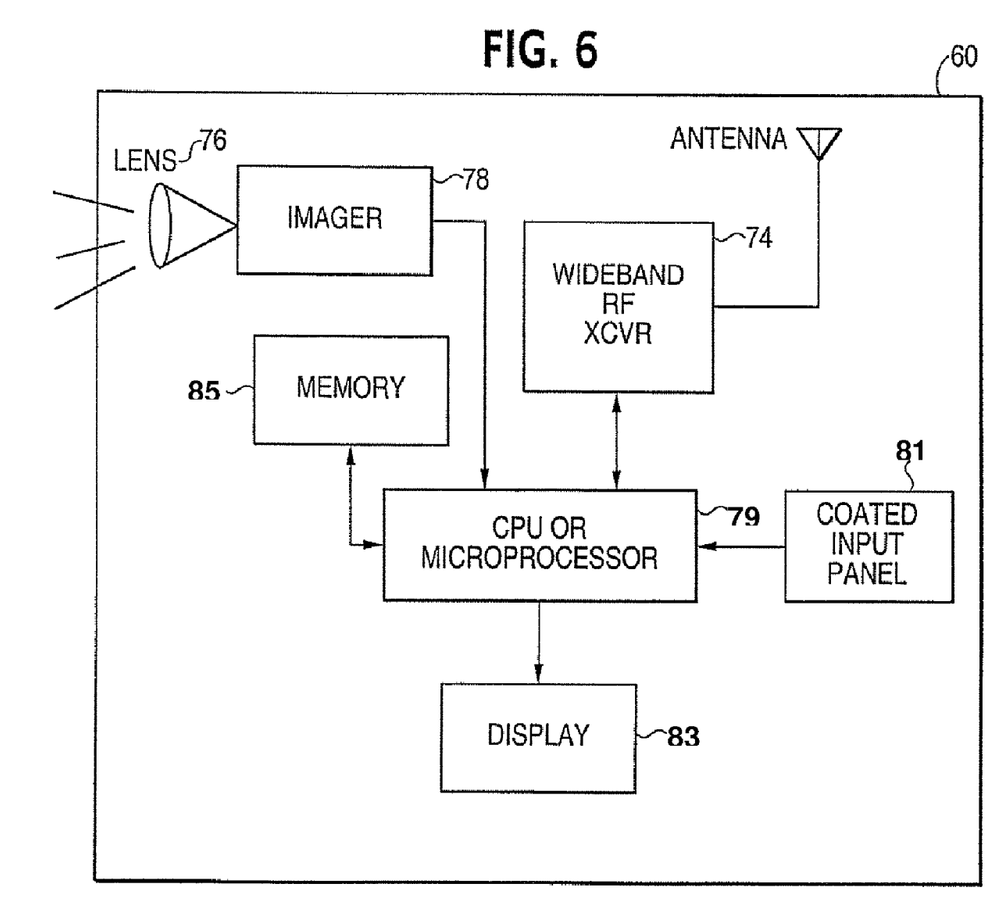
FIG. 6 is a schematic diagram illustrating a wideband transceiver in an appliance, such as camera, according to the present invention.

Referring to FIG. 6, a typical installation of the wideband transceiver 74 is shown in a digital camera 60. The camera 60 includes a lens 76, an image sensor 78. The overall operation of the camera 60 is controlled by a microprocessor 79, which receives control inputs from a control panel 81, displays control instructions and images on a display 83 and manages images stored in a camera memory 85. The transceiver 74 is controlled by the microprocessor 78 to transmit and receive images and instructions from other cameras and image utilization devices in the neighborhood of the camera. The other image utilization devices similarly contain microprocessor controls that control operation of the transceivers 74 which are located within them.

For other appliances, such as a music player, the imager 78 would be the music-playing component.

Figure 1:
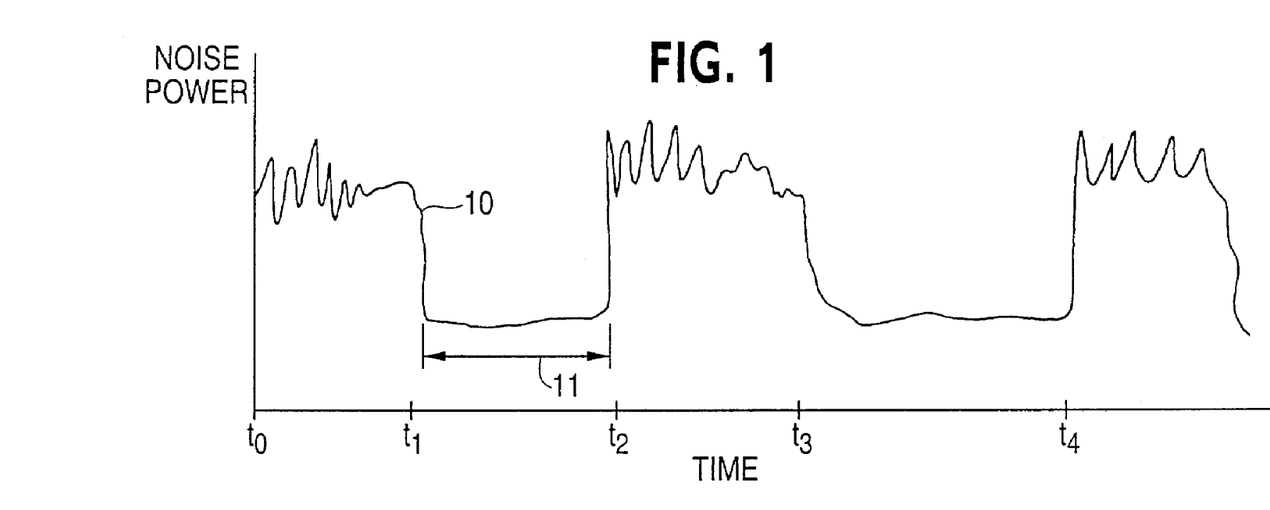
FIG. 1 is a plot of RF periodic noise produced by a microwave oven.

One problem encountered in operation in the 2.4 to 2.5 GHz band is interference cause by periodic noise sources, like the microwave oven, microwave radar or lighting structures, such as a magnetron driven lighting structure. In addressing this problem, it is understood that part of the noise produced by a microwave oven is periodic at a frequency based on the AC power line voltage frequency. Referring to FIG. 1, the period noise energy waveform 10 produced by a microwave oven is shown. The source of the RF noise energy is the magnetron within the microwave oven, which is driven by the AC power line. The output noise spectrum is pulsed at approximately a 50% duty cycle synchronized to the AC line voltage. The frequency of the microwave noise energy in North American, based on the AC power association, is 60 Hertz. According to the present invention, this pulsed noise is detected and communication is conducted during the quiescent periods, that is, during the periods 11 when the microwave oven is off.

Figure 2:
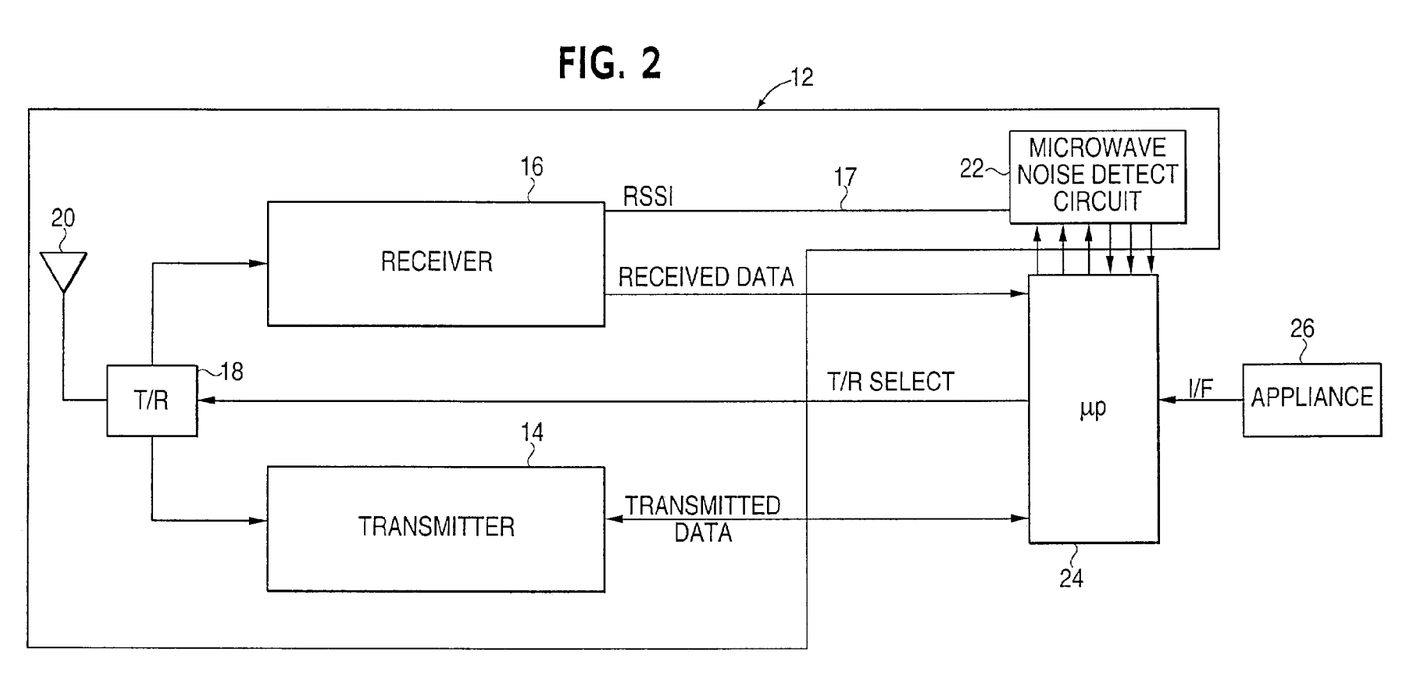
FIG. 2 is a block diagram of a transceiver according to the present invention.

Referring to FIG. 2, a system for communicating digital data according to the present invention includes a transceiver 12 for communicating in the presence of microwave oven. The transceiver includes a transmitter 14, a receiver 16, and a transmit/receive switch 18 that selectively connects an antenna 20 to the transmitter or the receiver. The transmitter 14 is a standard design 2.4 to 2.5 GHz transmitter employing any known modulation scheme such as FSK or QPSK. The receiver 16 is a standard design 2.4 to 2.5 GHz receiver with the capability of demodulating a 20 Mbps FSK or a 40 Mbps QPSK signal. The demodulator in the receiver 16 is for example a Motorola MC13155 integrated circuit. The transceiver 12 also includes a microwave noise detect circuit 22 connected to the RSSI 17 (Receive Signal Strength Indicator) of the receiver 16.

The transceiver 12 is controlled by a controller or microprocessor 24. The microprocessor 24 may, for example, be a microprocessor that is also used to control an appliance 26 (in this example a camera, but other devices could substitute such as a printer, kiosk, personal computer, PDA, music player, etc.), or may be a microprocessor that is specifically supplied with the communication system. The microprocessor 24 controls the transmit/receive switch 18, prepares the data from the appliance 26 to be transmitted by transmitter 14, and receives the data from the receiver 16 to supply received data to the appliance 26.

Figure 3:
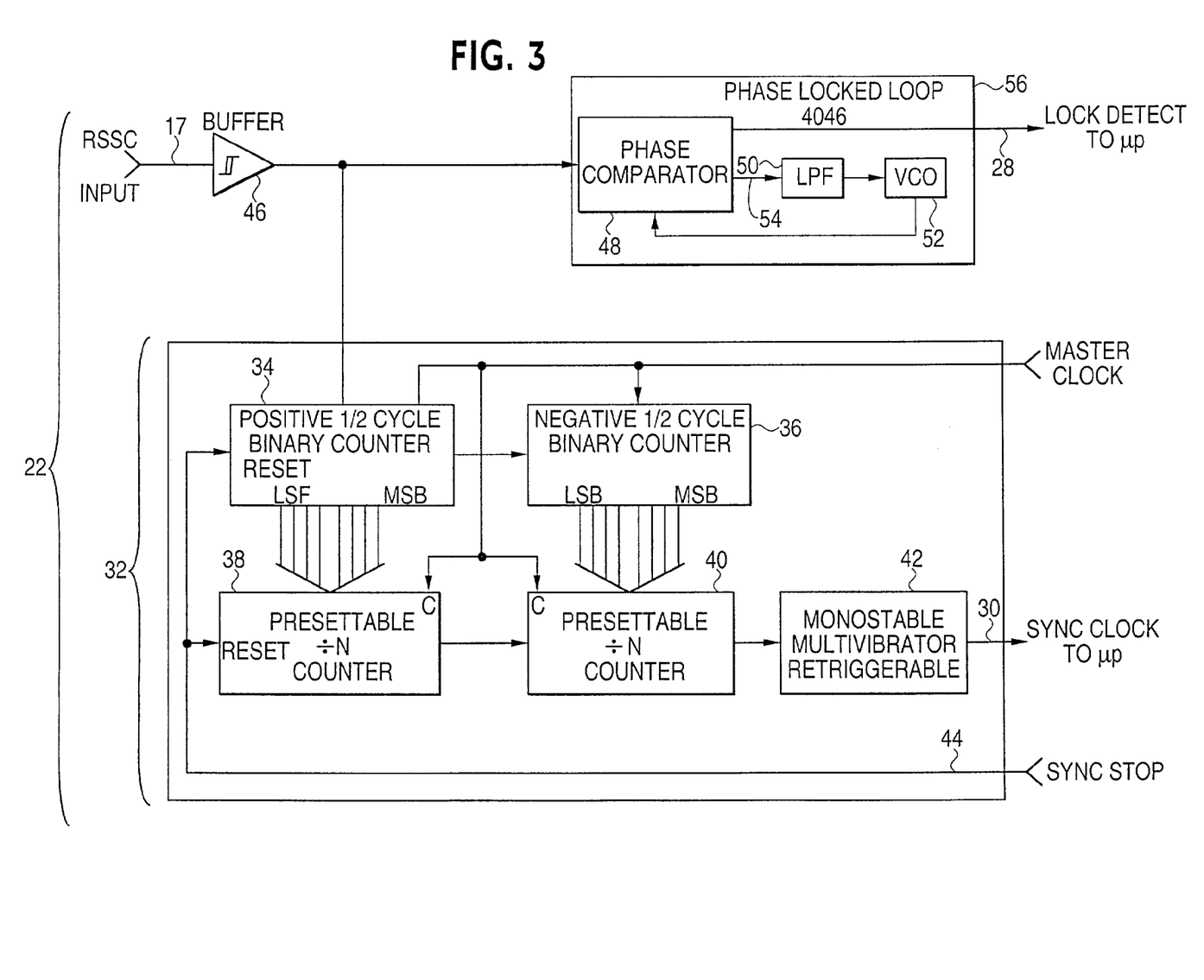
FIG. 3 is a block diagram of the microwave oven periodic noise detection circuit.

Referring to FIG. 3, microwave noise detect circuit 22 uses the RSSI signal 17 from the receiver 16 to generate a Sync Clock 30 and a Lock Detect 28 signal as described below, which are supplied to the microprocessor 24 for controlling the communication of data during quiescent periods in the microwave oven noise 10. The main function of this circuitry 22 is to lock on to the envelope of the microwave oven noise 10 using the AM detector in the RSSI circuitry (not shown) to generate a Lock Detect signal 28 and a synchronization (Sync) Clock 30 for the microprocessor.

The Lock Detect signal 28 informs the microprocessor 24 that a 60 Hertz microwave oven noise signature is present. To generate the Lock Detect signal 28, the RSSI 17 input signal coming from the receiver is first buffered 46 and provided both to a phase locked loop circuit 56 and sync clock generator circuitry 32. The phase locked loop circuit 56 includes a Voltage Controlled Oscillator (VCO) 52, a Phase Comparator 48 that produces a phase error output signal 54 and a Low Pass loop Filter (LPF) 50. The circuit is designed to provide a Lock Detect signal 28 if it is supplied with a 50 to 120 Hertz RSSI signal 17. The circuit is commercially available in integrated circuit form from manufacturers such as Motorola. A commonly used part number is CD4046.

Figure 4:
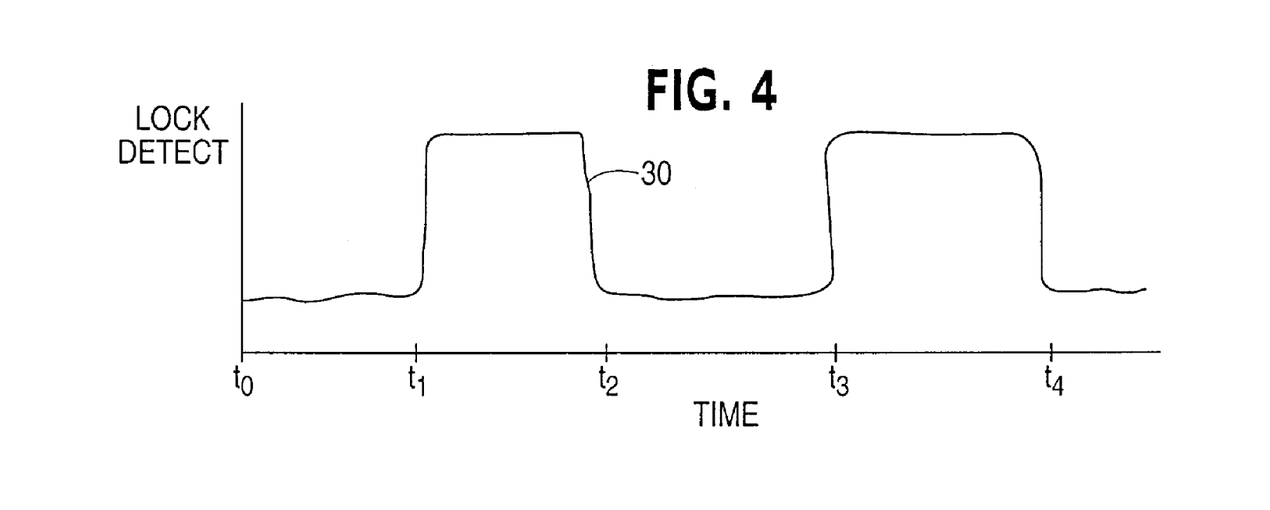
FIG. 4 is a plot of the sync clock signal generated by the microwave noise detection circuit.

FIG. 4 shows the Sync Clock signal 30 referenced to the microwave oven noise energy in FIG. 1. Sync Clock signal 30 is generated separately from Lock Detect signal 28 using sync clock generator circuitry 32. Sync Clock signal 30 is identical to the RSSI 17 signal in its pulse width, frequency and duty cycle. It is used to predict when the microwave oven will be in the quiescent state. This detect and latch process is necessary since the RSSI 17 signal will not be able to separate the microwave oven noise from the transceiver activity, once data communications commences. Binary counters 34 and 36 sample the RSSI 17 high and low periods and load the result into pre-settable counters 38 and 40. Once the data is loaded, the Sync Clock 30 is generated by monostable multivibrator 42 without the microwave signature provided by the RSSI signal 17. The Sync Clock 30 is provided to the microprocessor 24 and is used to enable the transmitting of the image data only during the predicted quiescent or "off" periods 11 in the microwave oven's noise signature. The Sync Clock 30 continues to run until the microprocessor determines it is no longer needed, or that it has shifted in phase. The microprocessor then signals the Sync Clock to stop using the Sync Stop control signal 44.

The Sync Clock signal can be used to control other functions such as a low power mode when the signal indicates a quiescent does not exist.

Phase shifting can be caused by noise from multiple microwave ovens in different power phases. If three ovens are on simultaneously using three different AC phases, the RSSI signal will be high the entire AC cycle and there will be no Lock Detect signal 28. The microprocessor 24 will cause the transceiver to search for a quiet channel. Once a lock is established however, the microprocessor 24 knows when to stop using the Sync Clock either when the receiver at the far end signals the transmitter that the microwave oven noise has stopped and it has verified the noise has stopped by listening, or its Lock Detect 28 goes high again synchronous with the Sync Clock signal 30, indicating that the oven noise is gone, and the transmitter is causing its own Lock Detect signal.

This approach works for different AC line frequencies, and works even if there are multiple ovens, or ovens on at least two phases of an AC distribution system.

Figure 7:
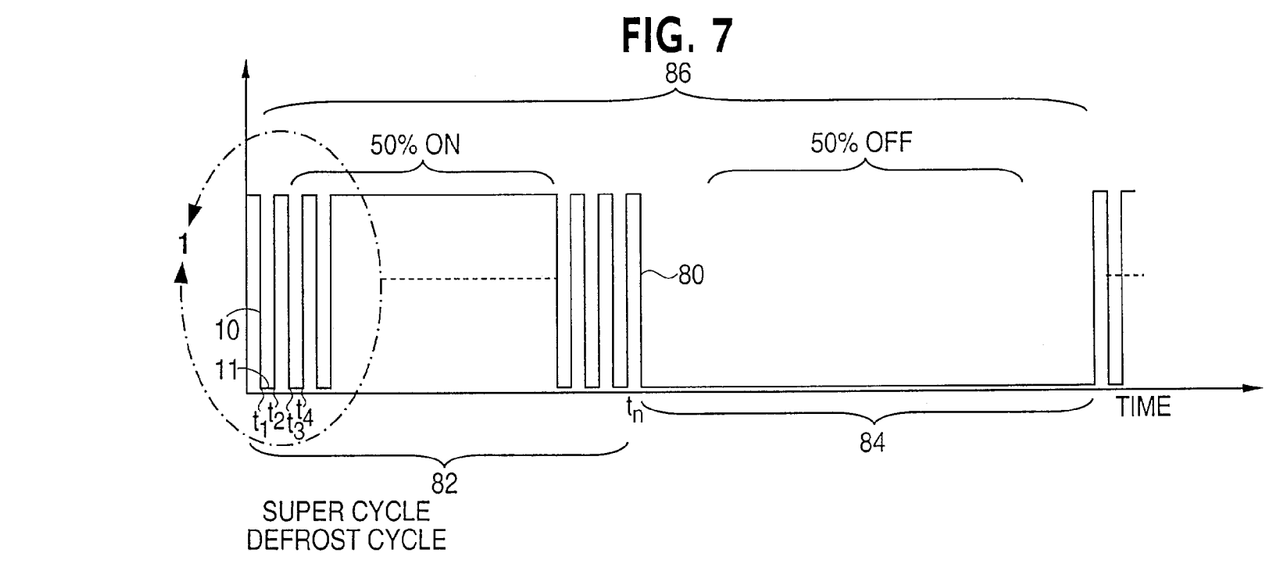
FIG. 7 depicts a super cycle.
Figure 8:
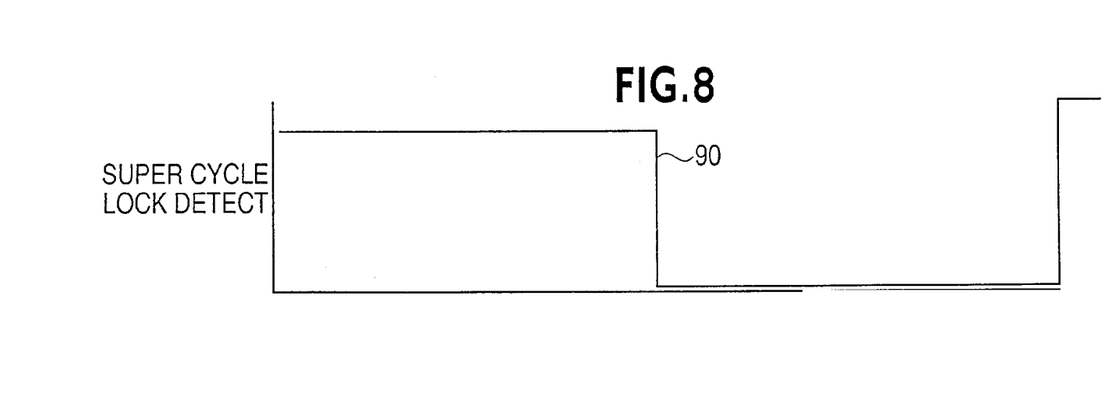
FIG. 8 illustrates a signal locked to the super cycle.

In addition to the periodic noise 10 depicted in FIG. 1 and the ability to synchronize data transmission to the quiescent periods 11 therein, the present invention synchronizes to a signal 80 with a super cycle of microwave noise therein, as depicted in FIG. 7. A super cycle is a waveform that includes a plurality or periodic pattern of fundamental, higher frequency, cycles. The frequency of the super cycles can vary and depends on the duty cycle of the fundamental cycle. One example of a super cycle occurs when a microwave oven is in a cyclic power mode, such as a defrost mode. A microwave oven may be on 4 cycles of 50% duty cycle per minute. On other cycles, it may be on 2 cycles of 10% duty cycle ((on time/off time)×100) in one minute. This signal 80 includes a noise period 82 where the noise is governed by the AC duty cycle of the oven and a quiescent period 84. The super cycle 86 includes the periods 82 and 84. The present invention not only detects and allows transmission in the periods 11 but also in the periods 84. This is accomplished by producing not only a noise Lock Detect signal 30 as depicted in FIG. 4, but also by producing a Super Cycle Lock Detect signal 90, as depicted in FIG. 8. Transmission is correlated with both the Lock Detect signal 30 and the Super Cycle Lock Detect signal 90.

Figure 9:
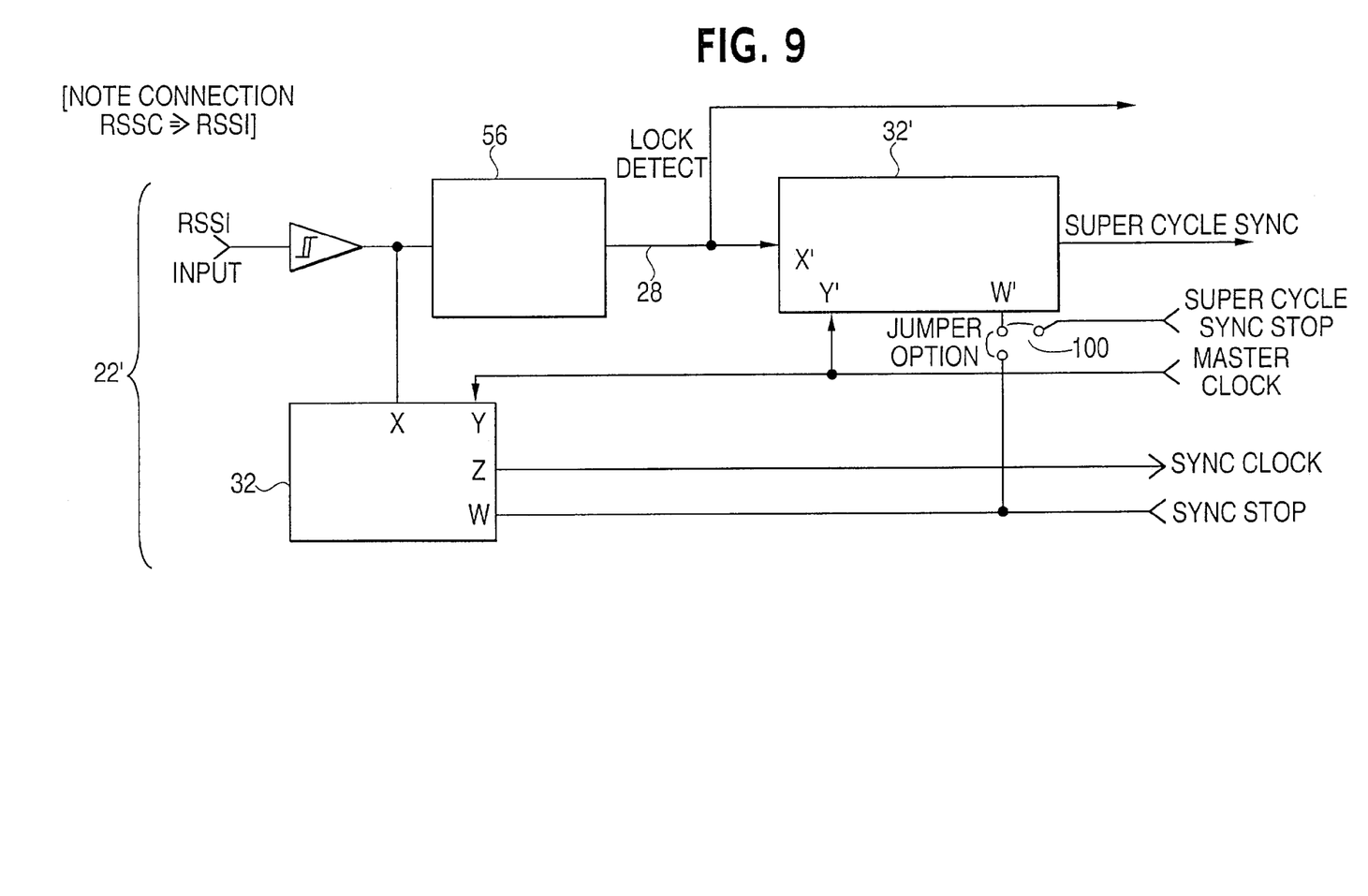
FIG. 9 is a block diagram of the microwave periodic and super cycle noise detection circuit.

The noise detect circuit 22 of FIG. 3 is modified, as depicted in FIG. 9, to additionally detect the super cycle 86, by duplicating the clock generator circuit 32 as a super cycle clock generator circuit 32'. The circuit 32' receives the Lock Detect signal from the phase lock loop circuit 56, and the Master Clock signal from the microprocessor 24. The Super Cycle Sync Stop signal is optionally received by circuit 32' from the microprocessor 24 rather than the Sync Stop signal responsive to the setting of a jumper 100 by the microprocessor 24. The super cycle can change based on the temperature of the object being cooked (such as a roast with an electronic thermometer) or a change from the defrost cycle to the full cook mode as preprogrammed. Consequently, the super cycle duty cycle waveform can change even if the fundamental AC cycle does not change. The jumper 100 allows each circuit, 32 or 32' to be reset individually depending on the nature and application of the noise source. In the case where the oven went from defrost to cook, resetting 32' allows the super cycle counters to be reset and a new sample to be recorded as fast as possible, separate from the fundamental cycle. The circuit 32', using the counters and vibrator depicted in FIG. 3, produces a Super Cycle Sync signal that is provided to the microprocessor 24 (see FIG. 2). The Lock Detect signal, the Sync Clock signal and the Super Cycle Sync signal are used by the microprocessor 24 to transmit in the quiescent periods 11 and 84. In any situation where lock detect is lost both the circuits 32 and 32' may need to be reset.

The periodic noise Sync Clock signal and particularly the Super Cycle Sync signal can be used for other functions in addition to or in an alternative to data transmittal and reception management. For example, the signals can be used to manage power. The signals can be used to put the microprocessor into and bring the microprocessor out of a sleep mode. The period of noise would be a low power period while the quiescent periods would be full power periods. The signal can put other circuits discussed herein into a low power mode, such as memory 86, transmitter 14, display 84, etc. The power mode control can be used with all sections of these devices, such as amplifiers, mixers, oscillators, logic, etc. Typically, such power management would be performed by the processor 24/80 where software would use the signals discussed above to control device switching between low and normal/full power modes.

It can be the case that several devices operating on different super cycles are within the range of the transmitting/receiving device. In this situation, the present invention can be applied to transmit/receive, manage power, etc. in the quiescent period of the combined waveform. When the combined waveform changes because of another super cycling device beginning to operate or one of the currently operating devices discontinuing operation, the lock detect signals of the present invention would drop out and the system would restart to detect the periodic nature of the new combined waveform created by the change.

The devices transmitting and receiving data noted in the discussion herein do so in packets in a wireless network environment. The present invention can perform network control operations via the processor 24/80 acting as a network manager, such as by adjusting the packet size of packets. The packet size of the packets can be adjusted responsive to the periodic quiescent cycle and/or the super cycle quiescent period by network manager using a technique described in U.S. Pat. No. 6,256,478, incorporated by reference herein.

The present invention has been described with respect to detecting periodic noise and a super cycle encompassing the periodic noise. The invention, by duplicating circuit 32' and changing duplicate with 32', can also detect an uber-cycle of noise enclosing the super cycle.

As transmit power levels in this band increase, increasing the range of the signals, the number of devices influenced by the noise grows. The present invention becomes even more important in such a situation.

The present invention has been described with respect to the appliance including the periodic noise and super cycle detection capability. The device associated with the appliance, such as a computer that sends music data to a music playing appliance, can also include the periodic noise and super cycle detection and transmission capability. Additionally devices such as computers that would not be considered appliances can communicate using the present invention. Additionally, periodic noise sources other than those mentioned herein can be detected.

The present invention has been described for use in controlling transmission within the quiescent periods by a transmitter/receiver. The present invention can also be used in a receive-only device, particularly to control power management with the receive-only device being switched to the low power mode during noise periods and to the normal power mode during quiescent periods. Likewise the invention can be used in a transmit-only device to control transmit as well as power functions.

The present invention can also be applied in a situation where pseudo-periodic noise sources are present.

The invention has been described in detail with particular reference to certain preferred embodiments thereof, but it will be understood that variations and modifications can be effected within the spirit and scope of the invention.

What is claimed is:

1. A system, comprising:
   a digital appliance having a high data rate wideband RF transceiver operating in a microwave band having microwave cycle noise and super cycle noise, detecting the super cycle of the super cycle noise and communicating digital data in a super cycle noise source quiescent period; and
   an associated device having a high data rate wide band RF transceiver operating in the same microwave band and communicating with the appliance.

2. A system as recited in claim 1, wherein the wireless communication sends and receives data during a quiescent period of an interfering periodic noise source.

3. A system as recited in claim 1, wherein the communication band is 2.4 to 2.5 GHz band and the noise source is one of a microwave oven, a magnetron driven lighting structure and a microwave radar.

4. A system as recited in claim 1, wherein the communication band is the 5.75 GHz SM band.

5. A system as recited claimed in claim 1, wherein the communication band is the 5.1 to 5.3 GHz HyperLAN Band.

6. A system as recited in claim 1, wherein the range of the RF transceiver is at least 300 meters.

7. An apparatus, comprising:
   a device having a high data rate wideband RF transmitter operating in a microwave band having microwave cycle noise and super cycle noise, detecting the super cycle of the super cycle noise and transmitting digital data in a super cycle noise source quiescent period.

8. An apparatus, comprising:
   a device having a high data rate wideband RF receiver operating in a microwave band having microwave cycle noise and super cycle noise, detecting the super cycle of the super cycle noise and receiving digital data in a super cycle noise source quiescent period.

9. An apparatus, comprising:
   an RF transceiver operating in a microwave band having microwave cycle noise and super cycle noise:
   a noise detector coupled to the transceiver and detecting a first quiescent period in periodic noise in the microwave band associated with the microwave cycle noise and detecting a second quiescent period in super cycle noise in the microwave band associated with the super cycle noise; and
   a controller transmitting/receiving data through the transceiver in the first and second quiescent periods.

10. An apparatus, comprising:
    an RF transceiver operating in a microwave band having microwave cycle noise and super cycle noise;
    a noise detector coupled to the transceiver and detecting a first quiescent period in periodic noise in the microwave band associated with the microwave cycle noise and detecting a second quiescent period in super cycle noise in the microwave band associated with the super cycle noise; and a controller transmitting/receiving data through the transceiver in the second quiescent period.

11. An apparatus, comprising:

an RF transceiver operating in a microwave band having microwave cycle noise and super cycle noise; and a noise detector coupled to the transceiver and detecting a first quiescent period in periodic noise in the microwave band associated with the microwave cycle noise and detecting a second quiescent period in super cycle noise in the microwave band associated with the super cycle noise, wherein said noise detector comprises:

a phase locked loop coupled to the transceiver and the controller, and providing a lock detect signal;

a periodic noise detector coupled to the transceiver and the controller, and providing a periodic noise sync signal; and     a super cycle noise detector coupled to the phase locked loop and the controller, and providing a super cycle noise sync signal and the controller transmitting data responsive to the periodic noise sync signal and the super cycle noise sync signal.

12. An apparatus, comprising:

an RF transceiver operating in a microwave band; and a noise detector coupled to the transceiver and detecting a first quiescent period in periodic noise in the microwave band and detecting a second quiescent period in super cycle noise in the microwave band, and wherein the super cycle noise detector comprises a counter counting a receive signal strength indicator signal producing a periodic noise sync signal, producing a lock signal synchronized to the receive signal strength indicator signal, and counting the lock signal producing a super cycle noise sync signal.

13. An apparatus, comprising:

an RF transceiver operating in a microwave band having microwave cycle noise and super cycle noise; and a noise detector coupled to the transceiver and detecting first quiescent period in noise at a first frequency in the microwave band associated with the microwave cycle noise and detecting second quiescent period in noise in the microwave band at a second frequency lower than the first frequency associated with the super cycle noise.

14. An apparatus as recited in claim 13, further comprising a power manager producing a low power mode signal in periods other than in the first and second quiescent periods.

15. An apparatus as recited in claim 13, further comprising a network manager performing network control responsive to the first and second quiescent periods.

16. An apparatus as recited in claim 15, wherein the network manager adjusts packet size responsive to the first and second quiescent periods.

17. A method, comprising:

detecting a first quiescent period periodic noise in the microwave band having microwave cycle noise and super cycle noise and detecting a second quiescent period in the super cycle noise in the microwave band; and performing a function responsive to the first and second quiescent periods.

18. A method as recited in claim 17, wherein the function comprises one of transmitting data, switching power modes and adjusting packet size.

19. A method, comprising:

detecting a first quiescent period in microwave cycle periodic noise and detecting a second quiescent period in microwave super cycle periodic noise; and performing data transmission or data reception in the first and second quiescent periods.

20. An apparatus, comprising:

an RF transceiver operating in a microwave band; and a noise detector coupled to the transceiver and detecting first quiescent period in microwave cycle periodic noise and detecting second quiescent period in microwave super cycle periodic noise and said transceiver transceiving in the first and second quiescent periods.

\* \* \* \* \*

UNITED STATES PATENT AND TRADEMARK OFFICE
CERTIFICATE OF CORRECTION

PATENT NO. : 7,308,233 B2  Page 1 of 1
APPLICATION NO. : 10/267589
DATED : December 11, 2007
INVENTOR(S) : James D. Allen It is certified that error appears in the above-identified patent and that said Letters Patent is hereby corrected as shown below:

Column 8, Line 33, after "is" delete "the".

Column 8, Line 33, change "SM" to --ISM--.

Column 8, Line 34, after "recited" delete "claimed".

Column 8, Line 35, after "is" delete "the".

Column 8, Line 36, after "recited" delete "claimed".

Column 8, Line 52, change "noise:" to --noise;--.

Signed and Sealed this

Twenty-seventh Day of May, 2008

JON W. DUDAS
*Director of the United States Patent and Trademark Office*